(12) United States Patent
Thomsen et al.

(10) Patent No.: US 6,529,965 B1
(45) Date of Patent: Mar. 4, 2003

(54) METHOD OF DETECTING TCP/IP BINDINGS OF INSTALLED NETWORK INTERFACE CARDS PRESENT IN A COMPUTER SYSTEM

(75) Inventors: Brant D. Thomsen, West Valley City, UT (US); Ronald D. Smith, American Fork, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/568,098

(22) Filed: May 9, 2000

(51) Int. Cl.[7] .......................... G06F 13/10; G06F 13/20
(52) U.S. Cl. .................. 710/8; 710/15; 710/19; 709/220; 709/224
(58) Field of Search ..................... 710/8, 15, 19; 709/220, 224

(56) References Cited

U.S. PATENT DOCUMENTS 5,941,950 A * 8/1999 Hwang et al. .............. 709/220
6,108,786 A * 8/2000 Knowlson ................... 713/151
6,157,965 A * 12/2000 Mohammed et al. ........ 370/401
6,195,712 B1 * 2/2001 Pawlowski et al. ......... 345/156

* cited by examiner

Primary Examiner—Jeffrey Gaffin
Assistant Examiner—Rehana Perveen
(74) Attorney, Agent, or Firm—Wagner, Murabito & Hao LLP (57) ABSTRACT

A method for detecting TCP/IP (Transmission Control Protocol/Internet Protocol) bindings for Network Interface Cards (NICs) installed on Windows 95® and Windows 98® operating systems with a VPN (Virtual Private Network) client present. The present invention provides a method for parsing the Windows™ system registry to detect TCP/IP bindings for network interface cards installed within a host computer system. In one embodiment, a DriverCheck function and a HardwareCheck function are implemented as parts of a computer software for detecting the TCP/IP bindings for network interface cards installed on the host computer system.

20 Claims, 8 Drawing Sheets

METHOD OF DETECTING TCP/IP BINDINGS OF INSTALLED NETWORK INTERFACE CARDS PRESENT IN A COMPUTER SYSTEM

FIELD OF THE INVENTION

The present invention pertains generally to the field of computer networking. More particularly, the present invention pertains to software applications used for configuring networking hardware installed on a computer system.

BACKGROUND OF THE INVENTION

Computer networks can be arranged in numerous configurations and in a variety of network types. Some of the most popular types of networks are Ethernet (coaxial cable or twisted-pair cable), token ring, Fiber Distributed Data Interface (FDDI), Frame Relay, Integrated Services Digital Network (ISDN), X.25, and Synchronous Data Link Control (SDLC). Typically, these networks are arranged in local area networks (LANs) and wide area networks (WANs). Usually, LANs are distinguished from WANs based upon the geographical area they cover and sometimes the number of users connected to the network. For example, a group of personal computers (PC) in a home or single business site (location) usually communicate with each over a LAN. Groups of PCs that are at remote locations from one another, such as those in different homes, different companies, or different branch offices of the same company, typically communicate with each other over a WAN. Most WANs typically require significant resources to provide service to a large number of users spread over a vast geographical area causing a WAN to be relatively expensive to build and maintain.

Some users utilize the Internet for virtual private networking to avoid the costs of a true private WAN network and/or paying for long distance communication bills. In essence, virtual private networking entails encrypting and decrypting IP packets for transport across the Internet. In some virtual private networks (VPNs), the payload portion of an IP packet is encrypted for transport across the Internet. The header information is left intact so that routers can forward the packet as it traverses the Internet. In other VPNs, an entire IP packet is encrypted and then encapsulated into new IP packets for transport across the Internet.

One use of the VPN is that it allows a mobile computer system (e.g., a laptop) to be connected to a remote LAN. Typically, a user of the mobile computer system initiates a local call to an Internet Service Provider (ISP) and establishes an Internet session. Then, the mobile computer system sends an Internet message via the Internet to the remote LAN. The mobile system and the remote LAN then engage in a security protocol or handshaking to verify the user is an authorized user permitted to have access to the LAN. Once it is established the user is authorized to have access to the second LAN, a VPN is established, allowing the user and the remote computer system to access data stored within the LAN.

Windows 95® and Windows 98® operating systems, however, do not provide native support for several types of VPNs. Therefore, a VPN software package is typically required to be installed in a system to provide for such specialized networking needs. "Virtual" network interface cards (NICs) are often installed as part of a VPN software package. By way of background, "real" NICs are those associated with one or more pieces of hardware installed on the computer. They include PCI NIC cards, ISA NIC cards, PCMCIA NIC cards, USB NIC cards, etc. A "virtual" NIC is one that is not associated with any hardware. Some examples of "virtual" NICs include "Dial-Up Networking," "Internet Connection Sharing," and "VPN." Virtual NICs are well known in the art and are a common way of providing specialized networking support.

When a VPN client is installed under Windows 95® or Windows 98®, it redirects a NIC's TCP/IP bindings, sometimes using one or more software virtual NICs. This redirection is done in the Windows™ System registry. Since the various VPN clients use slightly different methods for redirecting the TCP/IP bindings, it becomes difficult for a software application to reliably detect the TCP/IP binding for a particular NIC. To make matters worse, when a VPN is installed, the standard detection scheme for determining where the TCP/IP settings for each NIC are located in the registry no longer works.

Therefore, what is needed is a software application that allows an administrator or end-user to more easily modify the network settings associated with the Network Interface Cards (NICs) installed on a computer, whether or not a VPN client is installed.

SUMMARY OF THE DISCLOSURE

Accordingly, the present invention provides a method for detecting TCP/IP (Transmission Control Protocol/Internet Protocol) bindings for Network Interface Cards (NICs) installed on Windows 95® and Windows 98® operating systems with a VPN (Virtual Private Network) client present. More particularly, the present invention provides a method for parsing the Windows™ system registry to detect TCP/IP bindings for network interface cards installed within a host computer system. One embodiment of the present invention provides a DriverCheck function and a HardwareCheck function that can be implemented as parts of a computer software that detects TCP/IP bindings for installed network interface cards.

In accordance with one embodiment of the present invention, in order to determine whether a NIC (Network Interface Card) is bound to TCP/IP, the "Net" registry key for the NIC must be known. This is the key representing the NIC that is located under the "HKEY_LOCAL_MACHINE\System\CurrentControlSet\Services\Class\Net" registry key. Using the key as an input, the DriverCheck function and the HardwareCheck function of the present embodiment will return TRUE if the NIC is bound to TCP/IP, and FALSE otherwise. If TRUE is returned, the DriverCheck function of the present embodiment will also return the registry key location for the TCP/IP binding for that NIC.

In one embodiment, the DriverCheck function receives a value representing a registry key under the tree "HKEY_LOCAL_MACHINE\System\CurrentControlSet\Services\Class", and opens an "Ndi" subkey of the registry key. DriverCheck then extracts a "DeviceID" string value from the "Ndi" subkey. Thereafter, DriverCheck searches all the registry keys under the "HKEY_LOCAL_MACHINE\Enum" key for a hardware key that matches the "DeviceID" string value. If it is found, DriverCheck calls a HardwareCheck function with the first hardware key as input. HardwareCheck may return the TCP/IP registry key location. If so, the DriverCheck process could terminate.

If HardwareCheck does not return the TCP/IP registry key location, DriverCheck extracts a "MacName" string value from the registry key, and searches all the registry keys under the "HKEY_LOCAL_MACHINE\Enum" key for a second hardware key that matches the "MacName" string value. If a matching hardware key exists, DriverCheck calls HardwareCheck with the second hardware key as input. Again, if HardwareCheck returns the TCP/IP registry key location, the DriverCheck process could terminate.

If HardwareCheck still fails to return the TCP/IP registry key location, DriverCheck opens a "Ndi\Compatability" subkey of the registry key, and extracts an item from a "RequireAll" string value found therein. DriverCheck then searches all the registry keys under the "HKEY_LOCAL_MACHINE\Enum" key for a third hardware key that matches the item; and calls the HardwareCheck with the third hardware key as input if such a matching key can be found. If HardwareCheck returns the TCP/IP registry key location, the DriverCheck process could terminate.

In furtherance of one embodiment of the present invention, the HardwareCheck function receives a hardware key and opens a "Bindings" subkey under the hardware key. HardwareCheck enumerates every string value name under the "Bindings" subkey. For every string value name enumerated, HardwareCheck creates a first variable BindingName representative of the string value name and a second variable BindingPath representative of a concatenation of a string "HKEY_LOCAL_MACHINE\Enum\Network\" and BindingName. HardwareCheck then determines if BindingName begins with "MSTCP". If so, HardwareCheck returns the variable BindingPath as TCP/IP registry key location for the network interface card.

If the BindingName does not begin with "MSTCP", HardwareCheck opens a second registry key with the name as represented by BindingPath, and extracts a "Driver" string value therefrom. HardwareCheck then determines whether the "Driver" string value starts with "NetClient" or "NetService". If so, HardwareCheck then selects another string value name under the "Bindings" subkey for further processing.

If the "Driver" string value does not start with "NetClient" or "NetService", HardwareCheck then calls itself recursively using the registry key referred to by BindingPath as input. The recursively called HardwareCheck may return the TCP/IP registry key location.

If the recursively called HardwareCheck does not return the TCP/IP registry key location, HardwareCheck then generates a new driver string by appending the "Driver" string value to "HKEY_LOCAL_MACHINE\System\CurrentControlSet\Services\Class\". HardwareCheck then calls DriverCheck using the registry key referred to by the new string as input. DriverCheck may then return the TCP/IP registry key location. Otherwise, HardwareCheck should exit, indicating that the TCP/IP registry location could not be found.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing", "determining", "generating", "associating", "assigning" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Computer System Platform

Figure 1:
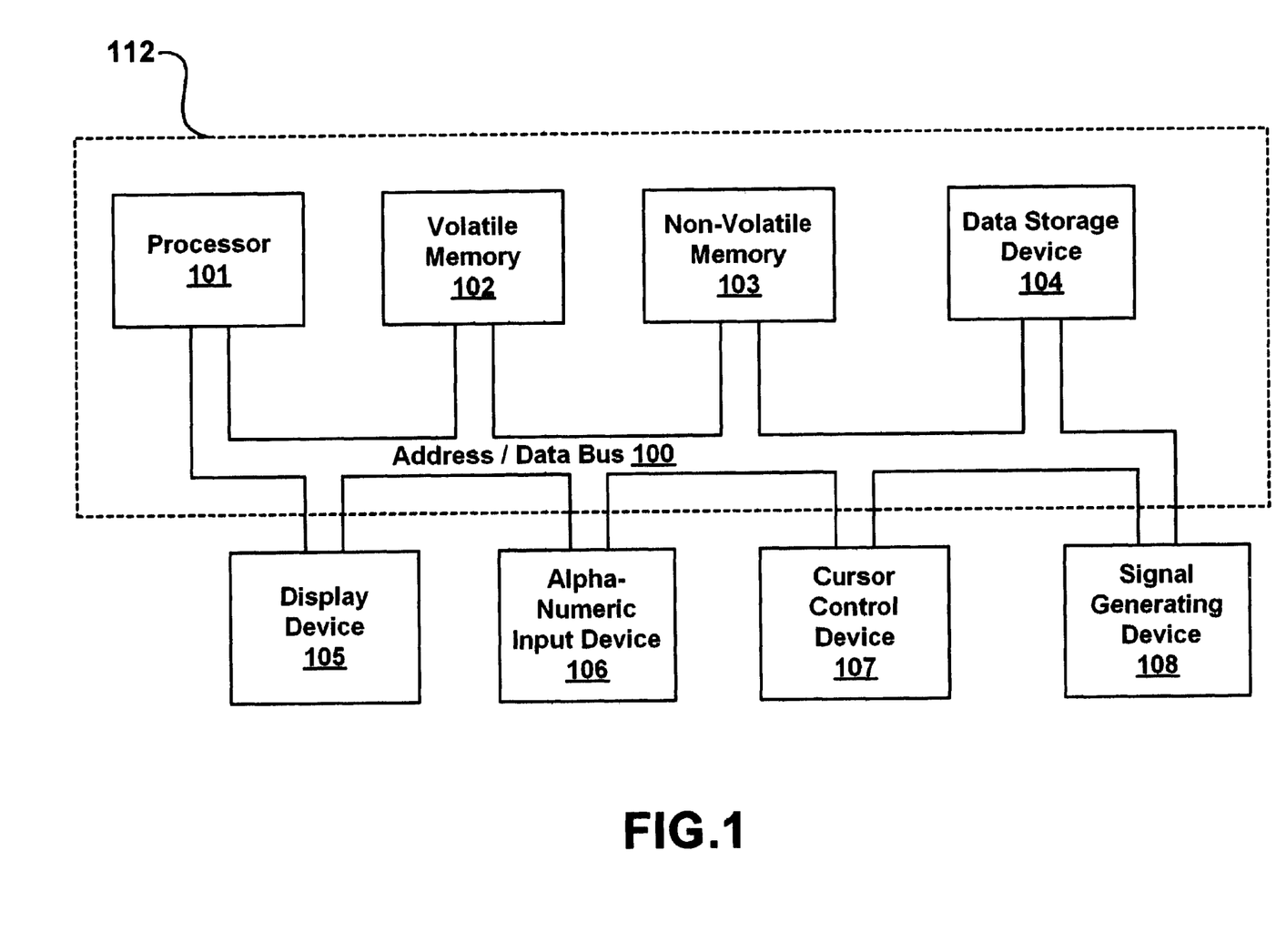
FIG. 1 illustrates an exemplary computer system platform upon which embodiments of the present invention may be practiced.

With reference to FIG. 1, portions of the present invention are comprised of computer-readable and computer executable instructions which reside, for example, in computer-usable media of a computer system. FIG. 1 illustrates an exemplary computer system 112 on which embodiments (e.g., process 300 and process 400) of the present invention may be practiced. It is appreciated that system 112 of FIG. 1 is exemplary only and that the present invention can operate within a number of different computer systems including general purpose computer systems, embedded computer systems, and stand alone computer systems specially adapted for controlling automatic test equipment.

Computer system 112 includes an address/data bus 100 for communicating information, a central processor 101 coupled with bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions. Data storage device 104 can include one or more removable magnetic or optical storage media (e.g., diskettes, tapes) which are computer readable memories. Memory units of system 112 include volatile memory 102, non-volatile memory 103 and data storage device 104.

Computer system 112 can further include an optional signal generating device 108 (e.g., a modem, or a network interface card "NIC") coupled to the bus 100 for interfacing with other computer systems. Also included in computer system 112 of FIG. 1 is an optional alphanumeric input device 106 including alphanumeric and function keys coupled to the bus 100 for communicating information and command selections to the central processor 101. Computer system 112 also includes an optional cursor control or directing device 107 coupled to the bus 100 for communicating user input information and command selections to the central processor 101. An optional display device 105 can also be coupled to the bus 100 for displaying information to the computer user. Display device 105 may be a liquid crystal device, other flat panel display, cathode ray tube, or other display device suitable for creating graphic images and alphanumeric characters recognizable to the user. Cursor control device 107 allows the computer user to dynamically signal the two dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands. The present invention is also well suited to directing a cursor by other means such as, for example, voice commands.

System Registry of Windows™ Operating Systems

The system registry is a database used for storing settings and options for Microsoft® Windows™ operating systems including Windows 95® and Windows 98®. The registry contains information and settings for many of the hardware, software, users, and preferences of a computer system. Whenever a user makes changes to a "Control Panel" settings, file associations, system policies, or installs new software and/or hardware, the changes are usually reflected and stored in the system registry. In most Windows 95® and Windows 98® computer systems, the physical files that make up the registry are stored in two hidden files under the "C:\WINDOWS" directory, called "USER.DAT" and "SYSTEM.DAT," and can be edited with a Registry Editor (regedit.exe) that is included in most versions of Windows™ operating systems.

Figure 2:
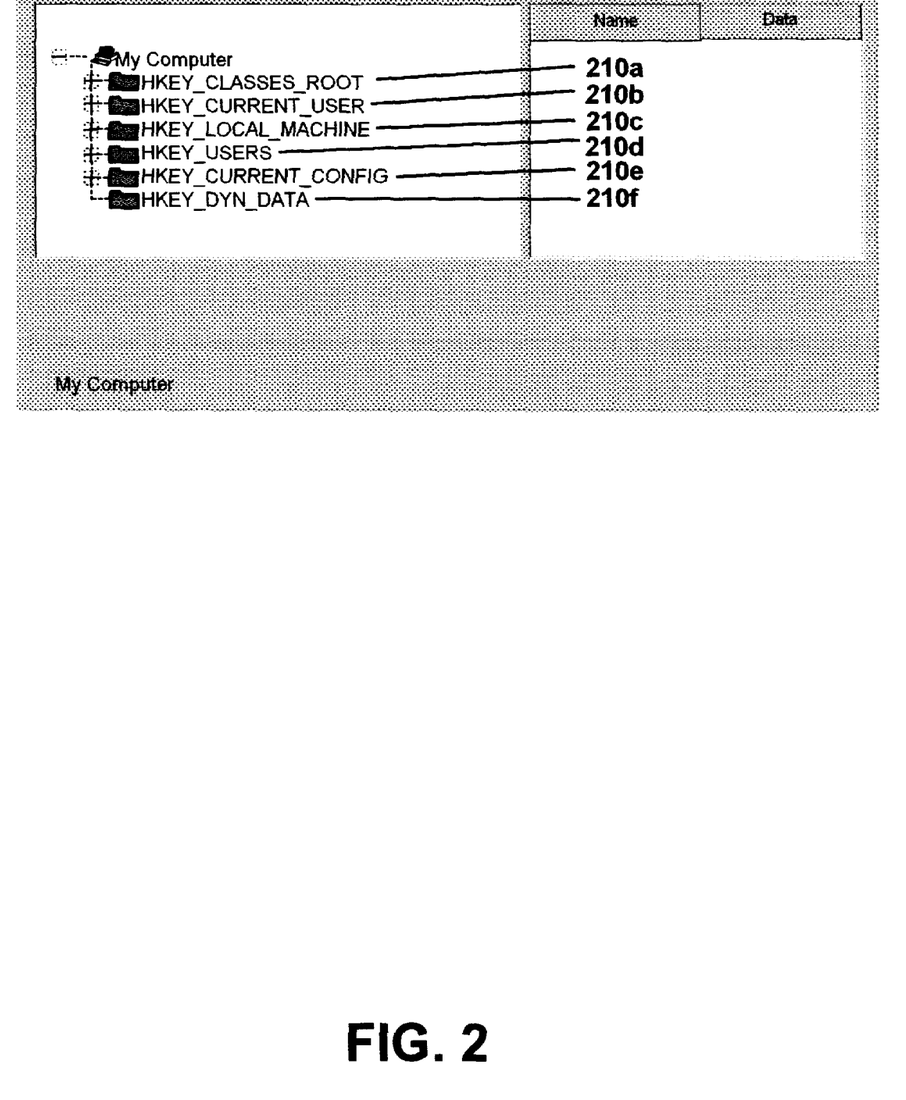
FIG. 2 is a graphical representation of an exemplary system registry.

The system registry has a hierarchical structure. Although the registry looks complicated, its structure is similar to the directory structure of a file system. An exemplary hierarchical structure of the system registry Windows 95® and Windows 98®, as graphically illustrated by registry editor "regedit.exe" is shown in FIG. 2. As illustrated, each main branch 210a–210f (denoted by a folder icon) is called a hive, and hives contains keys. Each key can contain other keys (sometimes referred to as sub-keys), as well as values. The values contain the actual information stored in the system registry. In Windows 95® and Windows 98®, there are three types of values: string, binary, and DWORD. There are six main branches 210a–210f, each containing a specific portion of the information stored in the system registry. The branch name and descriptions of their corresponding content are illustrated below in Table 1.

TABLE 1

| Branch Names | Content Description |
| --- | --- |
| HKEY_CLASSES_ROOT | This branch contains file association types, OLE information and shortcut data. |
| HKEY_CURRENT_USER | This branch links to the section of HKEY_USERS corresponding to the user currently logged onto the PC. |
| HKEY_LOCAL_MACHINE | This branch contains computer specific information about the type of hardware, software, and other preferences on a given PC. This information is used by all users who use the given computer. |
| HKEY_USERS | This branch contains individual preferences for each user of the computer. Each user is represented by a SID sub-key located under the main branch. |
| HKEY_CURRENT_CONFIG | This branch links to the section of HKEY_LOCAL_MACHINE appropriate for the current hardware configuration. |
| HKEY_DYN_DATA | This branch points to the part of HKEY_LOCAL_MACHINE, for use with the Plug-&-Play features of Windows ™, this section is dynamic and will change as devices are added and removed from the system. |

DriverCheck Function

The present invention provides a method of parsing the Windows™ system registry to detect TCP/IP (Transmission Control Protocol/Internet Protocol) bindings for network interface cards (NICs) installed on a computer system running Windows 95® or 98® operating systems with a VPN (Virtual Private Network) client present. Particularly, the present invention provides a DriverCheck function and a HardwareCheck function (which is called by the DriverCheck function) for detecting the TCP/IP binding for a particular installed NIC.

According to the present embodiment, in order to see if a NIC is bound to TCP/IP using the DriverCheck function, the "Net" registry key for the NIC must be known. This key is located under the HKEY_LOCAL_MACHINE\System\CurrentControlSet\Services\Class\Net key. The DriverCheck function is then called using this key as the input value. The DriverCheck function will return TRUE if the NIC is bound to TCP/IP, and FALSE otherwise. If TRUE is returned, the DriverCheck function will also return the registry key location for the TCP/IP binding for that NIC.

Figure 3:
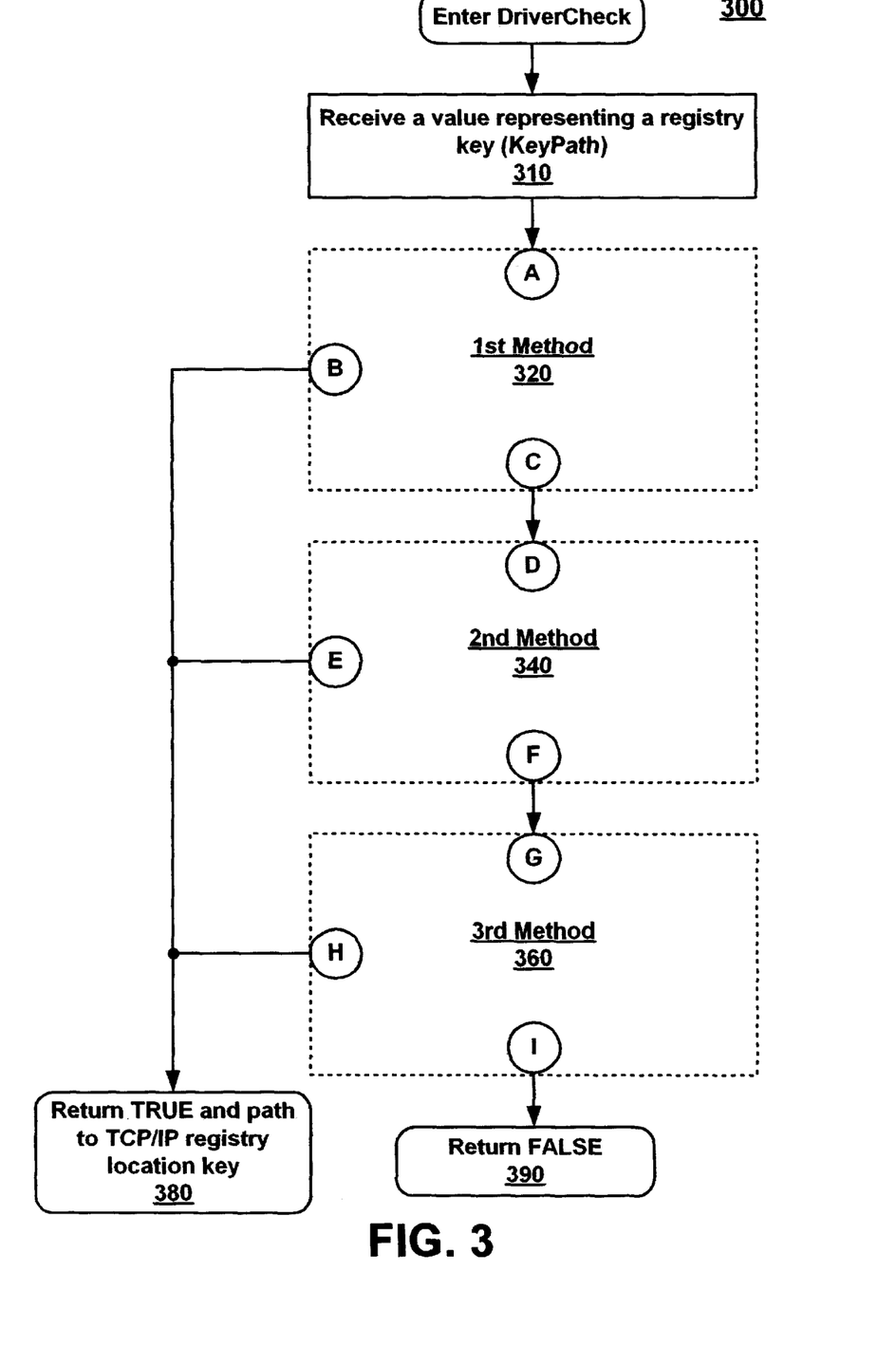
FIG. 3 is a flow chart diagram illustrating process steps of the DriverCheck function according to one embodiment of the present invention.

FIG. 3 is a flow chart diagram 300 illustrating process steps of the DriverCheck function according to one embodiment of the present invention. Process steps of the DriverCheck function, in the present embodiment, may be implemented with any computer languages commonly used by those of ordinary skill in the art.

As illustrated, at step 310, DriverCheck receives KeyPath, a value representing a "HKEY_LOCAL_MACHINE\System\CurrentControlSet\Services\Class\Net" key under the tree of the system registry. As discussed above, this key pertains to a particular NIC installed within the host computer system.

Figure 4A:
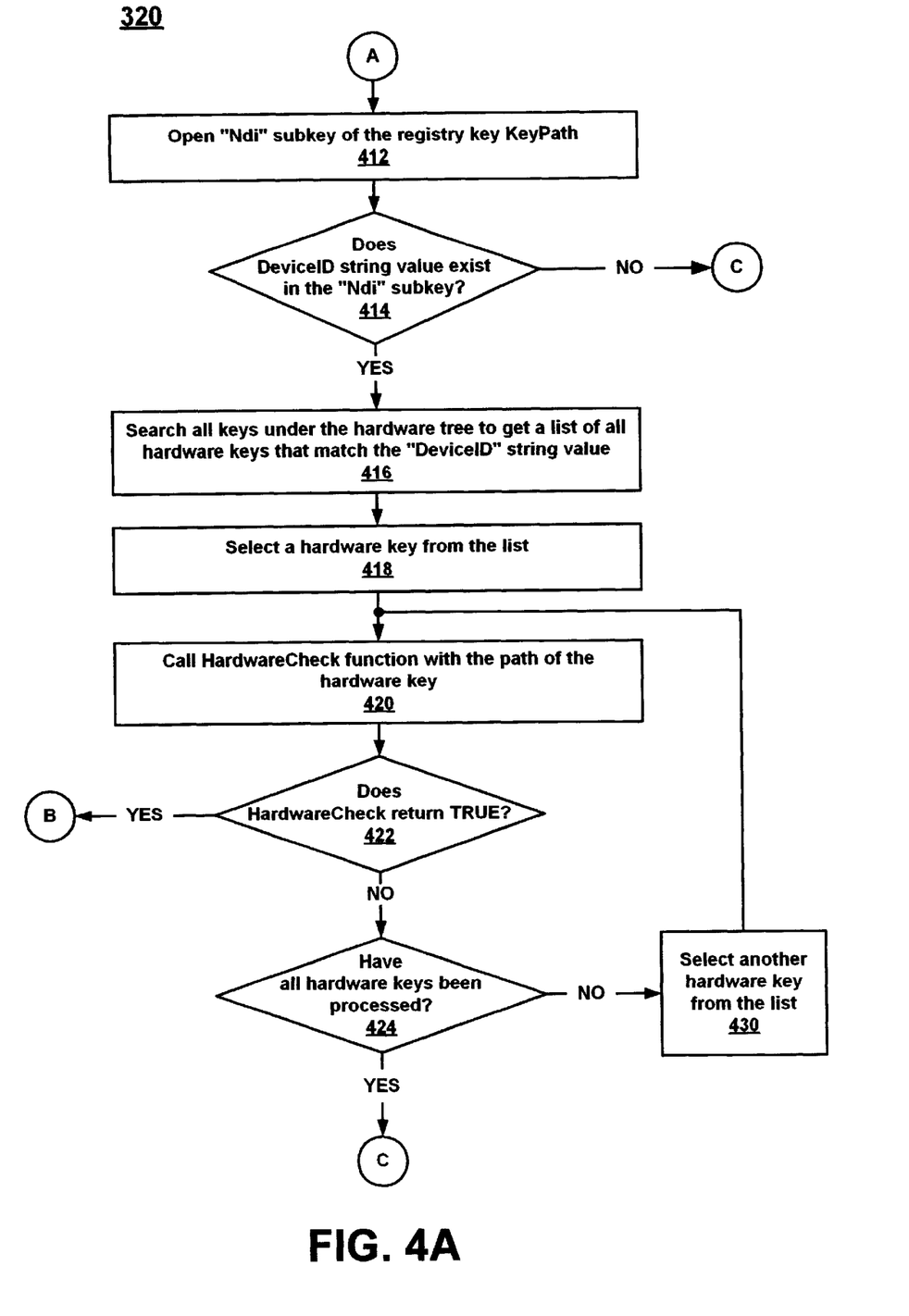
FIG. 4A illustrates steps the first detection method of FIG. 3 in accordance with one embodiment of the present invention.

After receiving the input KeyPath, DriverCheck then attempts to detect the registry key location of the TCP/IP binding for that particular NIC. In accordance with the present embodiment, DriverCheck then performs one of three different detection methods. The first detection method 320 attempts to detect the TCP/IP binding by examining the "Ndi" key of the registry key KeyPath. Steps of the first detection method 320 is illustrated in FIG. 4A, which is discussed in greater detail below.

Figure 4B:
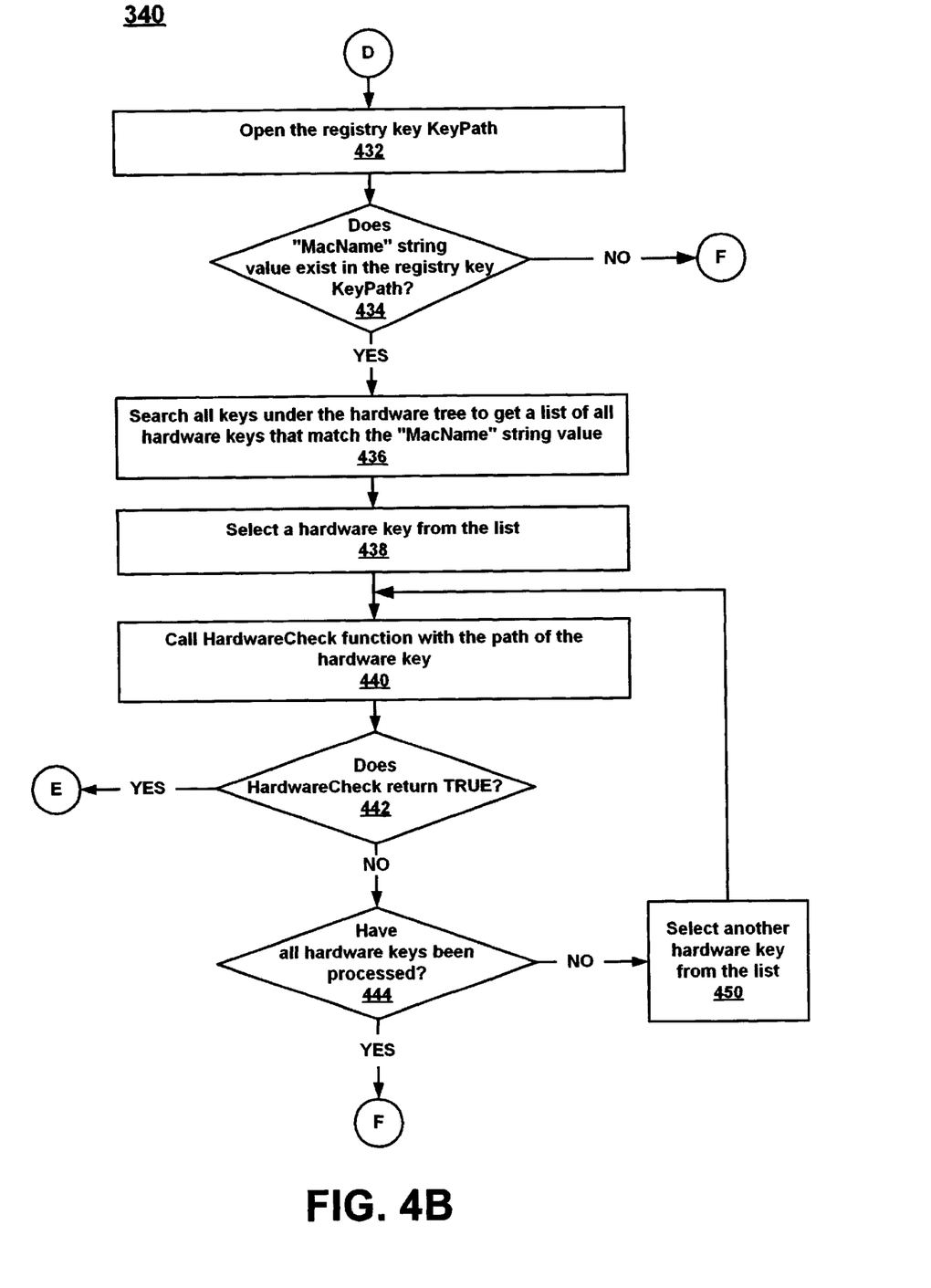
FIG. 4B illustrates steps the second detection method in accordance with one embodiment of the present invention.

The second detection method 340 attempts to detect the TCP/IP binding by examining the "MacName" string value of the registry key KeyPath. Steps of the second detection method 340 is illustrated in FIG. 4B, which is discussed in greater detail below.

Figure 4C:
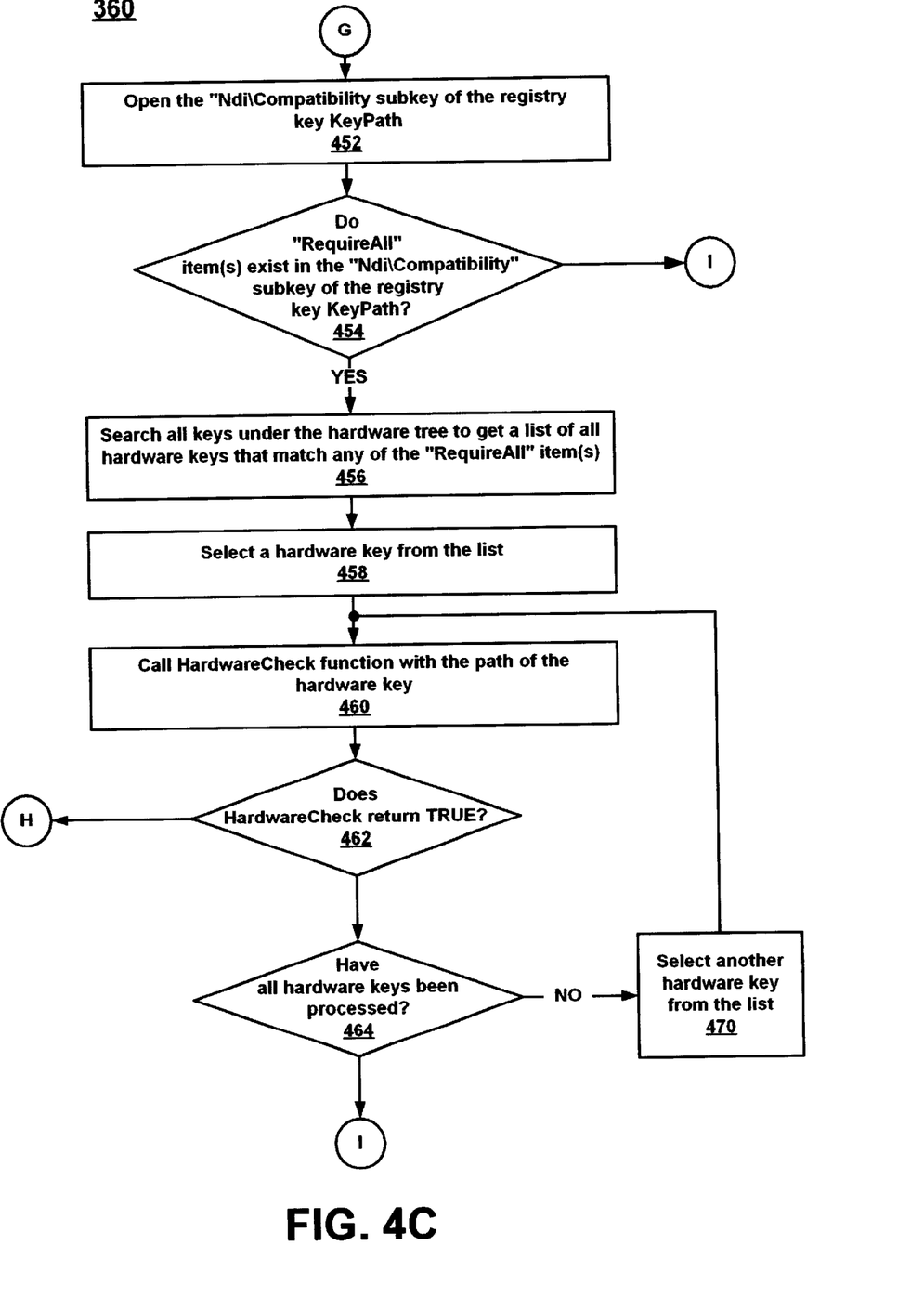
FIG. 4C illustrates steps the third detection method in accordance with one embodiment of the present invention.

The third detection method 360 attempts to detect the TCP/IP binding by examining the "Ndi\Compatibility" subkey of the registry key KeyPath. Steps of the third method 360 is illustrated in FIG. 4C, which is discussed in greater detail below.

In the present embodiment, DriverCheck performs the first detection method 320, the second detection method 340 and the third detection method 360 successively. DriverCheck of the present embodiment, however, does not have to perform all three detection steps. Rather, as soon as any one of these methods detects the TCP/IP binding, DriverCheck stops and returns TRUE and the registry key location of the TCP/IP binding at step 380. If none of these methods return TRUE, DriverCheck fails to detect the TCP/IP binding of that particular NIC, and returns FALSE at step 390.

FIG. 4A illustrates steps the first detection method 320 in accordance with one embodiment of the present invention. As shown, at step 412, process 300 opens the "Ndi" subkey of the registry key KeyPath.

At step 414, it is determined whether the "DeviceID" string value can be found within the "Ndi" subkey of the registry key KeyPath. If the "DeviceID" string value does not exist, then the first method 320 fails to detect TCP/IP binding. Method 320 is then aborted and DriverCheck continues with the second method 340.

If it is determined that the "DeviceID" string value exists, then at step 416, the first method 320 searches all the keys under the hardware tree (HKEY_LOCAL_MACHINE\Enum\ . . . ) to get a list of all the hardware keys that match the "DeviceID" string value.

Figure 5A:
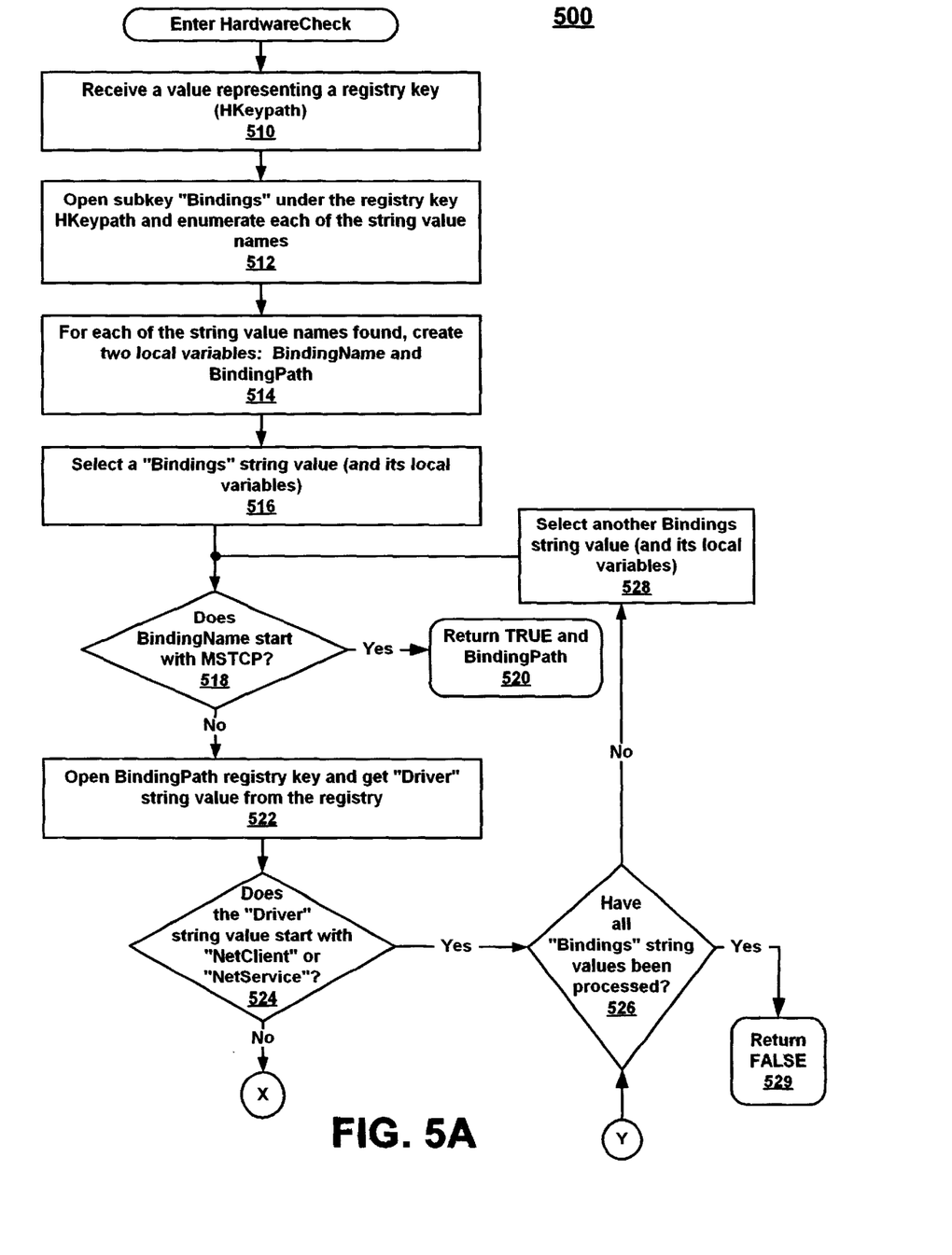
FIGS. 5A and 5B are flow chart diagrams illustrating process steps of the HardwareCheck function according to one embodiment of the present invention.
Figure 5B:
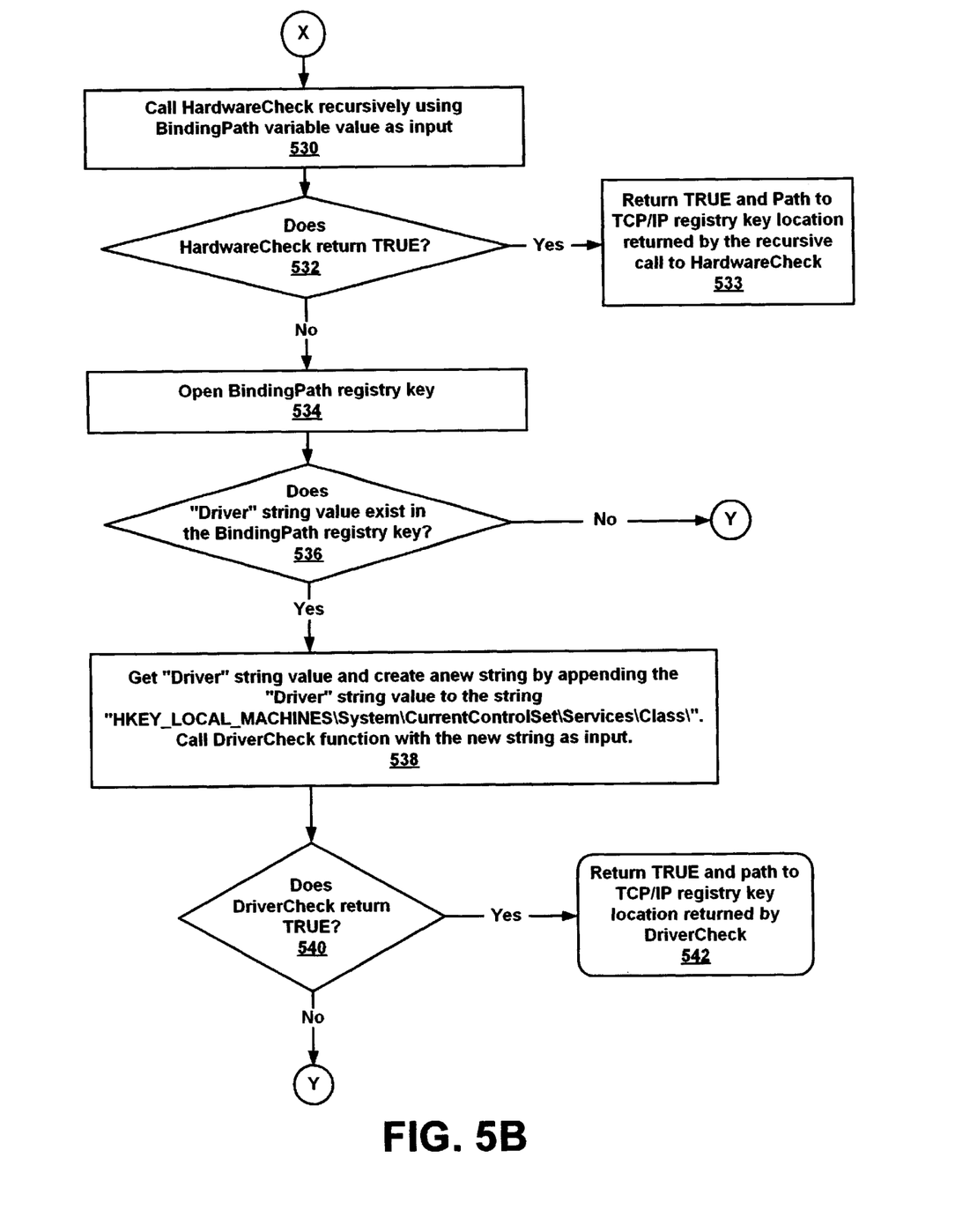

At step 418, a particular matching hardware key is selected from the list. Then, at step 420, the first method 320 calls a function "HardwareCheck" with the path of the selected hardware key as input. In the present embodiment, HardwareCheck receives the path of a hardware key as input and returns a logic value of either TRUE or FALSE. HardwareCheck also returns the path to the TCP/IP registry key location if TRUE is returned. Steps of the HardwareCheck function are illustrated in FIGS. 5A and 5B, which are discussed in more detail below.

At step 422, it is determined whether HardwareCheck returns TRUE. If HardwareCheck returns TRUE and the path to the TCP/IP registry key location, then the first method 320 has successfully detected the TCP/IP binding for the NIC specified by the input KeyPath. DriverCheck then returns TRUE and the path to the TCP/IP registry key location.

However, if HardwareCheck returns FALSE, then, at step 424, it is determined whether all the hardware keys of the list have been processed. If not, another hardware key is selected from the list at step 430. Steps 420–424 are then repeated until all the hardware keys are processed, or until TRUE is returned by HardwareCheck.

If all the hardware keys from the list have been processed and HardwareCheck does not return TRUE, DriverCheck continues the detection process by executing the second method 340.

FIG. 4B illustrates steps of the second method 340 in accordance with one embodiment of the present invention. As shown, at step 432, the second method 340 opens the registry key KeyPath.

At step 434, it is determined whether the "MacName" string value can be found within the registry key KeyPath. If the "MacName" string value does not exist, then second method method 340 fails to detect TCP/IP binding. Method 340 is then aborted and DriverCheck continues with the third method 360.

If it is determined that the "MacName" string value exists, then, at step 436, method 340 searches all the keys under the hardware tree (HKEY_LOCAL_MACHINE\Enum\ . . . ) to get a list of all the hardware keys that match the "MacName" string value.

At step 438, a particular matching hardware key is selected from the list. Then, at step 440, method 340 calls HardwareCheck with the path of the selected hardware key as input.

At step 442, it is determined whether HardwareCheck returns TRUE. If HardwareCheck returns TRUE and the path to the TCP/IP registry key location, then the second method 340 has successfully detected the TCP/IP binding for the NIC specified by the input KeyPath. DriverCheck then returns TRUE and the path to the TCP/IP registry key location.

However, if HardwareCheck returns FALSE, then, at step 444, it is determined whether all the hardware keys of the list have been processed. If not, another hardware key is selected from the list at step 450. Steps 440–444 are repeated until all the hardware keys are processed, or until TRUE is returned by HardwareCheck.

If all the hardware keys from the list have been processed, and HardwareCheck did not return TRUE, DriverCheck continues the detection process by executing the third method 360.

FIG. 4C illustrates steps of the third detection method 360 in accordance with one embodiment of the present invention. As shown, at step 452, the third method 360 opens the "Ndi\Compatibility" subkey of the registry key KeyPath.

At step 454, it is determined whether the "RequireAll" item(s) can be found within the "Ndi\Compatibility" subkey of the registry key KeyPath. If "RequireAll" item(s) do not exist, then the third method 360 fails to detect TCP/IP binding. Method 360 is then aborted and DriverCheck returns FALSE.

If it is determined that the "RequireAll" item(s) exist, then at step 456, the third method 360 searches all the keys under the hardware tree (HKEY_LOCAL_MACHINE\Enum\ . . . ) to get a list of all the hardware keys that match any one of the "RequireAll" item(s).

At step 458, a particular matching hardware key is selected from the list. Then, at step 460, the third method 360 calls HardwareCheck with the path of the selected hardware key as input.

At step 462, it is determined whether HardwareCheck returns TRUE. If HardwareCheck returns TRUE and the path to the TCP/IP registry key location, then the third method 360 has successfully detected the TCP/IP binding for the NIC specified by the input KeyPath. DriverCheck then returns TRUE and the path to the TCP/IP registry key location.

However, if HardwareCheck returns FALSE, then, at step 464, it is determined whether all the hardware keys of the list have been processed. If not, another hardware key is selected from the list at step 470, and steps 460–464 are repeated until all the hardware keys are processed, or until TRUE is returned by HardwareCheck.

If after all the hardware keys from the list have been processed and HardwareCheck does not return TRUE, then method 360 is aborted and DriverCheck returns FALSE.

HardwareCheck Function

FIGS. 5A and 5B illustrate a flow chart diagram 500 for steps of the HardwareCheck function in accordance with one embodiment of the present invention. HardwareCheck of the present embodiment is adapted to receive a hardware registry key under the tree HKEY_LOCAL_MACHINE\Enum\ and to return either TRUE or FALSE. The HardwareCheck function of the present embodiment is also adapted to return the path to the TCP/IP registry key location if TRUE is returned. Process steps of the HardwareCheck function, in the present embodiment, may be implemented with any computer languages commonly used by those of ordinary skill in the art.

With reference to FIG. 5A, at step 510, HardwareCheck receives HKeyPath, which is a value representing a registry key under the tree "HKEY_LOCAL_MACHINE\Enum\".

Then, at step 512, HardwareCheck opens the subkey "Bindings" under the HKeyPath registry key and enumerates each of the string value names. It should be noted that the values themselves are not important. Rather, the string value names will be used in the subsequent steps.

At step 514, for each of the string value names found, HardwareCheck creates two local variables: BindingName and BindingPath. The values of these variables are shown in Table 2 below.

TABLE 2

| | |
|---|---|
| BindingName | The value for this variable is the string value name currently under investigation. |
| BindingPath | The value for this variable is determined by appending the BindingName value to the string "HKEY_LOCAL_MACHINE†Enum†Network†". For example, a BindingName value of "MSTCP†0002" would result in a BindingPath value of "HKEY_LOCAL_MACHINE†Enum†Network†MSTCP†0002". |

With reference still to FIG. 5, at step 516, a "Bindings" string value name and its local variables are selected.

Then, at step 518, the variable BindingName is checked to see if it starts with the string "MSTCP".

At step 520, if it is determined that the BindingName variable starts with the string "MSTCP", it can be concluded that the desired TCP/IP binding has been found. HardwareCheck then returns TRUE and the BindingPath value to the parent process.

However, at step 522, if it is determined that the BindingName variable does not start with the string "MSTCP", HardwareCheck opens the BindingPath registry key and gets the "Driver" string value from the registry.

At step 524, it is determined whether the "Driver" string value exists and starts with "NetClient" or "NetService".

If it is determined that the "Driver" string value exists and starts with "NetClient" or "NetService", then the BindingName value does not bind to TCP/IP and no further checking should be done for this BindingPath value. Thus, at step 526, HardwareCheck determines whether all the "Bindings" string values have been processed. If the "Driver" string value does not exist or start with "NetClient" or "NetService", another "Bindings" string value name and its local variables are selected at step 528. If all the "Bindings" string value names have been processed, then HardwareCheck returns FALSE at step 529.

With reference now to FIG. 5B, at step 530, if it is determined that the "Driver" string value does not exist or does not start with "NetClient" or "NetService", HardwareCheck calls itself recursively using the BindingPath variable value as input.

With reference still to FIG. 5B, at step 532, it is determined whether the recursive function call returns TRUE. At step 533, if the function call returns TRUE, this instance of the HardwareCheck should also return TRUE and the TCP/IP binding returned by the recursive call to HardwareCheck.

However, if the function call does not return TRUE, then, at step 534, the HardwareCheck function opens the BindingPath registry key. At step 536, HardwareCheck determines whether the "Driver" string exists in the BindingPath registry key. If not, HardwareCheck fails to detect the TCP/IP binding for the string value name currently under investigation. HardwareCheck then selects another "Bindings" string value name or returns FALSE. Otherwise, the process proceeds to step 538.

At step 538, HardwareCheck creates a new string by appending the "Driver" string value to the string "HKEY_LOCAL_MACHINE\System\CurrentControlSet\Services\Class\" and call the DriverCheck function with this new string as input. For example, a "Driver" string value of "NetTrans\0002" would result in a new string of "HKEY_LOCAL_MACHINE\System\CurrentControlSet\Services\Class\NetTrans\0002". The DriverCheck function would then be called with this new string as input.

At step 540, HardwareCheck determines whether DriverCheck returns TRUE. If not, HardwareCheck fails to detect the TCP/IP binding for the string value name currently under investigation. HardwareCheck then selects another "Bindings" string value name or returns FALSE. If DriverCheck returns TRUE, HardwareCheck also return TRUE and the TCP/IP binding returned by this instance of DriverCheck at step 542.

The present invention, a method of parsing the Windows™ system registry to detect TCP/IP (Transmission Control Protocol/Internet Protocol) bindings for network interface cards (NICs) installed on a computer system, has thus been disclosed. The present invention allows such determination to be made automatically and easily through the examination of the system registry. While the present invention has been described in particular embodiments, it should be appreciated that the present invention should not be construed as limited by such embodiments, but should be construed according to the claims below.

What is claimed is:

1. In a computer system running on a Windows™-based operating system, a method of detecting the TCP/IP binding location for a network interface card by calling a driver check function, wherein said driver check function is adapted for causing said computer system to perform steps comprising of:
   (a) identifying a registry key for said network interface card;
   (b) opening an "Ndi" subkey of said registry key;
   (c) extracting a "DeviceID" string value from said "Ndi" subkey;
   (d) determining a first hardware key that matches said "DeviceID" string value;
   (e) calling a hardware check function with said first hardware key as input, wherein said hardware check function is adapted for causing said computer system to perform steps of:
      (e1) opening a "Bindings" subkey under said hardware key;
      (e2) enumerating a string value name under said "Bindings" subkey;
      (e3) creating a first variable for storing said string value name and a second variable for storing a concatenation of a string "HKEY_LOCAL_MACHINE\Enum\Network\" and said string value; and
      (e4) provided that said first variable begins with "MSTCP", returning said second variable as TCP/IP registry key location for said network interface card.

2. A method as described in claim 1 wherein said step (e) further comprises steps of:
   opening a second registry key having a same name as said second variable;
   extracting a "Driver" string value from said second registry key;
   provided that said string value starts with one of "NetClient" and "NetService", returning a failure result indicating that said network interface card is not bound to TCP/IP.

3. A method as described in claim 2 wherein said step (e) further comprises step of calling said hardware check function recursively using said second variable as input.

4. A method as described in claim 3 wherein said step (e) further comprises steps of:
   generating a new driver string by appending said "Driver" string to "HKEY_LOCAL_MACHINE\System\CurrentControlSet\Services\Class\";
   calling said driver check function using said new driver string as input.

5. A method as described in claim 1 further comprising steps of:
   opening said registry key;
   extracting a "MacName" string value from said registry key;
   determining a second hardware key that matches said "MacName" string value; and
   calling said hardware check function with said second hardware key as input.

6. A method as described in claim 1 further comprising steps of:
   opening a "Ndi\Compatability" subkey of said registry key;
   extracting an item from a "RequireAll" string value;
   determining a third hardware key that matches said item; and
   calling said hardware check function with said third hardware key as input.

7. In a computer system running on a Windows™-based operating system, a method of detecting the TCP/IP binding location for a network interface card by calling a driver check function, wherein said driver check function is adapted for causing said computer system to perform steps comprising of:
   (a) opening a registry key for said network interface card;
   (b) extracting a "MacName" string value from said registry key;
   (c) determining a first hardware key that matches said "MacName" string value; and
   (d) calling a hardware check function with said first hardware key as input, wherein said hardware check function is adapted for causing said computer system to perform steps of:
      (e1) opening a "Bindings" subkey under said hardware key;
      (e2) enumerating a string value name under said "Bindings" subkey;
      (e3) creating a first variable for storing said string value name and a second variable for storing a concatenation of a string "HKEY_LOCAL_MACHINE\Enum\Network\" and said string value; and
      (e4) provided that said first variable begins with "MSTCP", returning said second variable as TCP/IP registry key location for said network interface card.

8. A method as described in claim 7 wherein said step (e) further comprises steps of:
   opening a second registry key having a same name as said second variable;
   extracting a "Driver" string value from said second registry key;
   provided that said string value starts with one of "NetClient" and "NetService", returning a failure result indicating that said network interface card is not bound to TCP/IP.

9. A method as described in claim 8 wherein said step (e) further comprises step of calling said hardware check function recursively using said second variable as input.

10. A method as described in claim 9 wherein said step (e) further comprises steps of:
    generating a new driver string by appending said "Driver" string to "HKEY_LOCAL_MACHINE\System\CurrentControlSet\Services\Class\";
    calling said driver check function using said new driver string as input.

11. A method as described in claim 7 further comprising steps of:
    opening a "Ndi\Compatability" subkey of said registry key;
    extracting an item from a "RequireAll" string value;
    determining a second hardware key that matches said item; and
    calling said hardware check function with said second hardware key as input.

12. In a computer system running on a Windows™-based operating system, a method of detecting the TCP/IP binding location for a network interface card by calling a driver check function, wherein said driver check function is adapted for causing said computer system to perform steps comprising of:

(a) identifying a registry key for said network interface card;

(b) opening an "Ndi" subkey of said registry key;

(c) extracting a "DeviceID" string value from said "Ndi" subkey;

(d) determining a first hardware key that matches said "DeviceID" string value;

(e) calling a hardware check function with said first hardware key as input;

(f) provided a TCP/IP registry location is not determined by said step (e), extracting a "MacName" string value from said registry key;

(g) determining a second hardware key that matches said "MacName" string value; and (h) calling said hardware check function with said second hardware key as input;

(i) provided a TCP/IP registry key location is not determined by said step (h), (j) opening a "Ndi\Compatability" subkey of said registry key;

(k) extracting an item from a "RequireAll" string value;

(l) determining a third hardware key that matches said item; and calling said hardware check function with said third hardware key as input.

13. A method as described in claim 12 wherein said hardware check function is adapted for causing said computer system to perform steps comprising of:

opening a "Bindings" subkey under said hardware key;

enumerating a string value name under said "Bindings" subkey;

creating a first variable for storing said string value name and a second variable for storing a concatenation of a string "HKEY_LOCAL_MACHINE\Enum\Network\" and said string value; and provided that said first variable begins with "MSTCP", returning said second variable as TCP/IP registry key location for said network interface card.

14. A method as described in claim 13 wherein said hardware check function is adapted for causing said computer system to further perform steps comprising of:

opening a second registry key having a same name as said second variable;

extracting a "Driver" string value from said second registry key;

provided that said string value starts with one of "NetClient" and "NetService", returning a failure result indicating that said network interface card is not bound to TCP/IP.

15. A method as described in claim 14 wherein said hardware check function is adapted for causing said computer system to further perform a step comprising of calling said hardware check function recursively using said second variable as input.

16. A method as described in claim 15 wherein said hardware check function is adapted for causing said computer system to further perform steps comprising of:

generating a new driver string by appending said "Driver" string to "HKEY_LOCAL_MACHINE\System\CurrentControlSet\Services\Class\";

calling said driver check function using said new driver string as input.

17. A computer readable medium for storing computer readable codes adapted for causing a computer system to perform a method of detecting the TCP/IP binding location for a network interface card by calling a driver check function, wherein said driver check function is adapted for causing said computer system to perform steps comprising of:

(a) identifying a registry key for said network interface card;

(b) opening an "Ndi" subkey of said registry key;

(c) extracting a "DeviceID" string value from said "Ndi" subkey;

(d) determining a first hardware key that matches said "DeviceID" string value;

(e) calling a hardware check function with said first hardware key as input;

(f) provided a TCP/IP registry location is not determined by said step (e), extracting a "MacName" string value from said registry key;

(g) determining a second hardware key that matches said "MacName" string value; and (h) calling said hardware check function with said second hardware key as input;

(i) provided a TCP/IP registry key location is not determined by said step (h), (j) opening a "Ndi\Compatability" subkey of said registry key;

(k) extracting an item from a "RequireAll" string value;

(l) determining a third hardware key that matches said item; and calling said hardware check function with said third hardware key as input.

18. A computer readable medium as described in claim 17 wherein said hardware check function is adapted for causing said computer system to perform steps of:

opening a "Bindings" subkey under said hardware key;

enumerating a string value name under said "Bindings" subkey;

creating a first variable for storing said string value name and a second variable for storing a concatenation of a string "HKEY_LOCAL_MACHINE\Enum\Network\" and said string value; and provided that said first variable begins with "MSTCP", returning said second variable as TCP/IP registry key location for said network interface card.

19. A computer readable medium as described in claim 18 wherein said hardware check function is adapted for causing said computer system to further perform steps comprising of:

opening a second registry key having a same name as said second variable;

extracting a "Driver" string value from said second registry key;

provided that said string value starts with one of "NetClient" and "NetService", returning a failure result indicating that said network interface card is not bound to TCP/IP.

20. A computer readable medium as described in claim 19 wherein said hardware check function is adapted for causing said computer system to further perform a step comprising of calling said hardware check function recursively using said second variable as input.

* * * * *